# 3,071,465
FOG REDUCTION IN SILVER HALIDE EMULSIONS BY 2H-TETRAZOLIUM HALIDES

Fritz Dersch and Millet R. De Angelus, Binghamton, N.Y., assignors to General Aniline & Film Corporation, New York, N.Y., a corporation of Delaware
No Drawing. Filed Mar. 14, 1961, Ser. No. 95,498
20 Claims. (Cl. 96—66)

This invention relates to photographic materials and to methods of preparing them. More particularly, this invention relates to light-sensitive silver halide emulsions containing a stabilizing and antifogging agent.

It is well known in the photographic art that light-sensitive emulsions, such as gelatino-silver halide emulsions, have a tendency to fog. Fog is usually caused by a prolonged ripening of the emulsion, by prolonged storage especially at elevated temperatures and humidity, and by prolonged development. To overcome this undesirable property, it has been the practice in this art to add certain chemical compounds to the emulsions to increase their stability and to reduce their tendency to fog. However, many of the stabilizing and antifogging compounds heretofore used in this art have the disadvantage that upon addition to the emulsion they cause a loss of speed and/or contrast of the emulsion. This loss of speed is particularly pronounced in those regions of the spectrum to which the emulsions are optically sensitized.

It is, accordingly, an object of this invention to produce a light-sensitive emulsion which is fast, stable, has a reduced tendency to fog and has good contrast.

A further object of this invention resides in a light-sensitive emulsion which contains a compound which stabilizes the emulsion against fogging and at the same time does not materially reduce the speed and/or the contrast of the emulsion.

We have discovered that 2,3,5-trisubstituted-2H-tetrazolium halides when added to a light-sensitive silver halide emulsion, stabilize and inhibit the fogging of the emulsion without reducing the contrast of the emulsion or lowering its speed in the regions of optical sensitization.

The 2,3,5-trisubstituted tetrazolium salts, the use of which is contemplated herein, may be represented by the following formula:

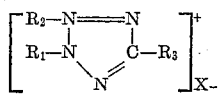

wherein $R_1$, $R_2$ and $R_3$ are alkyl radicals, e.g., methyl, ethyl, propyl, isopropyl, butyl, isobutyl, amyl, hexyl, undecyl, dodecyl; or aryl radicals, e.g., phenyl, tolyl, naphthyl, hydroxyphenyl, carboxyphenyl, aminophenyl, acylaminophenyl or alkoxyphenyl; and wherein X represents a halide atom, e.g., chloride, bromide or iodide.

The following specific compounds are examples of compounds belonging to the class of compounds having the general formula given above which we have found suitable for use as stabilizing and antifogging agents:

2,3,5-triphenyl-2H-tetrazolium chloride
2,3,5-triphenyl-2H-tetrazolium bromide
2-p-tolyl-3,5-diphenyl-2H-tetrazolium chloride
3-(4-hydroxyphenyl)-2,5-diphenyl-2H-tetrazolium chloride
3-(4-hydroxyphenyl)-2,5-diphenyl-2H-tetrazolium iodide
3-(4-methoxyphenyl)-2,5-diphenyl-2H-tetrazolium chloride
3-(3-carboxyphenyl)-2,5-diphenyl-2H-tetrazolium iodide
3-(4-acetaminophenyl)-2,5-diphenyl-2H-tetrazolium iodide
5-hendecyl-3-(f-naphthyl)-2-phenyl-2H-tetrazolium chloride
5-amyl-2,3-diphenyl-2H-tetrazolium chloride
3-(p-bromophenyl)-5-hendecyl-2-phenyl-2H-tetrazolium chloride
3-(o-carboxyphenyl)-5-heptyl-2-phenyl-2H-tetrazolium chloride
5-ethyl-2,3-diphenyl-2H-tetrazolium chloride
5-hendecyl-2,3-diphenyl-2H-tetrazolium chloride
5-hexyl-2,3-diphenyl-2H-tetrazolium chloride
3-(p-hydroxyphenyl)-5-methyl-2-phenyl-2H-tetrazolium chloride
5-isobutyl-2,3-diphenyl-2H-tetrazolium chloride
5-isopropyl-2,3-diphenyl-2H-tetrazolium chloride
5-methyl-2,3-diphenyl-2H-tetrazolium chloride These compounds are prepared by treating formazane or an N,N'-disubstituted formazyl derivative with a mild oxidizing agent such as isoamyl nitrite, yellow mercury oxide or lead tetracetate. The preparation of these compounds is described in more detail in Berichte, vol. 27, pages 2922–2930; vol. 29, pages 1849–51; vol. 31, page 1755; vol. 32, page 1919; vol. 74B, pages 941–8; vol. 77B, pages 591–601, and in The Rev. faculté sci. univ., Istanbul.

The antifogging agents of our invention may be added to the emulsion at any stage during its process of production. Thus, they may be added as a "ripening final" or as a "coating final." When added as a "ripening final," they are added during the ripening or sensitivity increasing stage of the emulsion making process. Such addition may be made before, during or after the addition of the soluble silver salt to the soluble halide in the presence of a suitable colloid, such as gelatin, polyvinyl alcohol, solubilized casein or albumin. When added as a "coating final," the antifogging agent of our invention is added to the emulsion just prior to coating it on a suitable support such as glass, paper, or film at a time when the emulsion has nearly attained its maximum sensitivity.

In some instances, it is advantageous to apply the antifogging and stabilizing compounds of our invention in a separate layer such as an undercoating layer or in an anti-abrasion gelatin surface. Sometimes it is desirable to incorporate the compounds in one or all processing baths such as the developer solution or in the pre- and post-baths.

When used as a "ripening final," the antifoggants of our invention are preferably added to the emulsion in an amount ranging from 0.1 milligram to 50 milligrams per 0.6 mol of silver halide and when used as a "coating final," it is preferably added is an amount ranging from 10 milligrams to 150 milligrams per 0.6 mol of silver halide. The optimum amount to be added depends primarily on the type of emulsion and should be determined individually in each case.

The stabilizers and antifoggants of our invention may also be used in combination with known antifoggants and stabilizers. The antifoggants of our invention can also be used in combination with sensitizers such as sulfur, metal and reduction sensitizers as well as with speed-increasing agents and accelerators such as the reaction products of long-chain alcohols and ethylene oxide (see U.S. Patent 1,970,578) and their derivatives and polyvinyl-pyrrolidone.

The novel antifoggants of our invention may be used with various types of photographic emulsions, such as non-sensitized, orthochromatic, panchromatic and X-ray emulsions, paper emulsions and color emulsions.

The following specific examples are given as an illustration of the manner in which the antifoggants of our invention can be used. It is to be understood, however, that these examples are given by way of illustration and not by way of limitation.

Example I

A silver halide emulsion in gelatin containing 2 percent silver iodide and 98 percent silver bromide was prepared in a conventional manner and brought up to its maximum light sensitivity. It was then readied for coating, finals were added such as sensitizing dyes and hardening agents. A 0.1 percent solution 2,3,5-triphenyl-2H-tetrazolium chloride prepared according to the method described in Berichte, vol. 27, pages 2928, was added in varying amounts to samples of the emulsion as an antifoggant and stabilizer. Each emulsion sample contained about 0.6 mol of silver halide. The so prepared emulsion samples were coated on a suitable cellulose ester base and dried. Samples of these film coatings were then exposed in a type IIB sensitometer and developed in a developer of the following composition:

| | Grams |
|---|---|
| Metol | 1.5 |
| Sodium sulfite (anhydrous) | 45 |
| Sodium bisulfite | 1 |
| Hydroquinone | 6 |
| Sodium carbonate (monohydrated) | .8 |

Water to make 1 liter.

The developed samples were short-stopped, fixed, washed and dried. The results obtained were as follows:

| Quantity of compound used, mg. | Relative speed | Fog at 12 minute development | Oven fog at 6 minute development |
|---|---|---|---|
| 0 | 100 | .29 | .25 |
| 10 | 100 | .24 | .20 |
| 20 | 100 | .22 | .17 |
| 50 | 100 | .20 | .15 |
| 80 | 75 | .20 | .12 |

Example II

The procedure followed was identical to Example I, except that in place of 2,3,5-triphenyl-2H-tetrazolium chloride the compound used was 5-hexyl-2,3-diphenyl-2H-tetrazolium chloride prepared according to the method described in Berichte, vol. 74B, page 946.

The results obtained were essentially identical with those described in Example I.

Example III

The procedure followed was identical to Example I, but in place of 2,3,5-triphenyl-2H-tetrazolium chloride, the compound used was 5-hendecyl-3-(1-naphthyl)-2-phenyl-2H-tetrazolium chloride which had been prepared according to the method described in Berichte, vol. 74B, page 948.

The results obtained were essentially the same as those reported in Example I.

Example IV

Exposed samples of a photographic film were developed for twelve minutes at 65° F. in a standard metol-hydroquinone developer. Two tests were made, one with the normal developing solution and one with a developer containing 10 mgs. of 2,3,5-triphenyl-2H-tetrazolium chloride per one liter of developer.

Sensitometric strips, developed in the normal control developer for twelve minutes showed a fog of .30, whereas those strips which were developed in the developer containing the antifoggant had a fog of .20.

Example V

A silver halide emulsion in gelatin containing 2 percent silver iodide and 98 percent silver bromide was coated on filmbase in a manner known to the art. After the coating was performed, an aqueous gelatin solution containing 20 grams of gelatin per 1 liter and 20 mg. of 2,3,5-triphenyl-2H-tetrazolium chloride was coated thereon as an anti-abrasion layer. After drying, film samples were exposed and processed as described in Example I. The samples exhibited a relative speed of 100 and a fog of .20 compared with type coating of the above emulsion having an anti-abrasion layer similar to that described above, but lacking the antifoggant and having a speed of 100 and a fog of .30.

Our invention is not limited to the detailed description contained herein, but includes all modifications that fall within the scope of the appended claims.

We claim:

1. A light-sensitive silver halide emulsion containing as an antifoggant a compound of the following general formula:

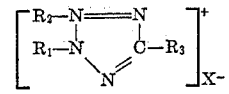

wherein $R_1$, $R_2$ and $R_3$ are members of the group consisting of alkyl and aryl radicals; and X is a member of the group consisting of chloride, bromide and iodide.

2. A light-sensitive silver halide emulsion as recited in claim 1, wherein the antifogging and stabilizing compound is 2,3,5-triphenyl-2H-tetrazolium chloride.

3. A light-sensitive silver halide emulsion as recited in claim 1, wherein the antifogging and stabilizing compound is 5-hexyl-2,3-diphenyl-2H-tetrazolium chloride.

4. A light-sensitive halide emulsion as recited in claim 1, wherein the antifogging and stabilizing compound is 5-hendecyl-3-(1-naphthyl)-2-phenyl-2H-tetrazolium chloride.

5. A light-sensitive silver halide emulsion as recited in claim 1, wherein the antifogging and stabilizing compound is present in the emulsion in the ratio of 0.1 to 150 milligrams per 0.6 mol of silver halide.

6. A light-sensitive silver halide emulsion as recited in claim 1, containing an optical sensitizer.

7. A light-sensitive silver halide emulsion as recited in claim 1, containing an accelerator.

8. A light-sensitive photographic element comprising a base and a coating of a gelatino silver halide emulsion thereon, said emulsion containing as an antifogging and stabilizing agent a compound of the following formula:

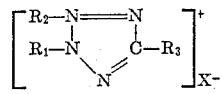

wherein $R_1$, $R_2$ and $R_3$ are selected from the group consisting of alkyl and aryl radicals and X is a halide selected from the group consisting of chloride, bromide and iodide.

9. A light-sensitive element according to claim 8 wherein the antifoggant and stabilizing agent is 2,3,5-triphenyl-2H-tetrazolium chloride.

10. A light-sensitive element according to claim 8 wherein the antifoggant and stabilizing agent is 5-hexyl-2,3-diphenyl-2H-tetrazolium chloride.

11. A light-sensitive element according to claim 8 wherein the antifoggant and stabilizing agent is 5-hendecyl-3-(1-naphthyl)-2-phenyl-2H-tetrazolium chloride.

12. A light-sensitive structure comprising a base, a layer of light-sensitive silver halide emulsion thereon, and a separate layer adjacent said first mentioned layer containing as an antifogging and stabilizing agent, a compound of the following general formula:

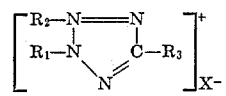

wherein $R_1$, $R_2$ and $R_3$ are selected from the group consisting of an aliphatic radical and an aryl radical; and X is a halide selected from the group consisting of chloride, bromide and iodide.

13. A light-sensitive structure as recited in claim 12 wherein said antifogging and stabilizing compound is 2,3,5-triphenyl-2H-tetrazolium chloride.

14. A light-sensitive structure as recited in claim 12 wherein said antifogging and stabilizing compound is 5-hexyl-2,3-diphenyl-2H-tetrazolium chloride.

15. A process of forming a photographic emulsion having a reduced tendency to fog which comprises forming the emulsion, ripening the emulsion and, during said ripening, adding thereto a compound of the following general formula:

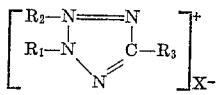

wherein $R_1$, $R_2$ and $R_3$ are selected from the group consisting of aliphatic and aryl radicals; and X is a halide selected from the group consisting of chloride, bromide and iodide.

16. A process of forming a light-sensitive photographic element having a reduced tendency to fog which comprises forming an emulsion, ripening said emulsion, coating said emulsion on a base and adding to said emulsion just prior to the coating thereof on the base a compound of the following general formula:

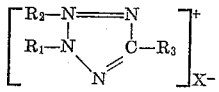

wherein $R_1$, $R_2$ and $R_3$ are selected from the group consisting of an aliphatic radical and an aryl radical; and X is a halide selected from the group consisting of chloride, bromide and iodide.

17. The process of minimizing and preventing fog in a light-sensitive silver halide material, comprising a base having a light-sensitive emulsion thereon which comprises exposing said emulsion to light and developing the same in the presence of an antifoggant of the following formula:

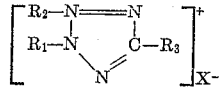

wherein $R_1$, $R_2$ and $R_3$ are members selected from the group consisting of an alkyl radical and an aryl radical; and X is a member selected from the group consisting of chloride, bromide and iodide.

18. The process of minimizing and preventing fog in a light-sensitive silver halide material as recited in claim 17 wherein said antifoggant is 2,3,5-triphenyl-2H-tetrazolium chloride.

19. The process of minimizing and preventing fog in a light-sensitive silver halide material as recited in claim 17 wherein said antifoggant is 5-hexyl-2,3-diphenyl-2H-tetrazolium chloride.

20. The process of minimizing and preventing fog in a light-sensitive silver halide material as recited in claim 17 wherein said antifoggant is 5-hendecyl-3-(1-naphthyl)-2-phenyl-2H-tetrazolium chloride.

No references cited.